(12) United States Patent
Blake, III et al.

(10) Patent No.: US 9,415,662 B2
(45) Date of Patent: Aug. 16, 2016

(54) METHOD AND APPARATUS FOR DETERMINING TEMPERATURE AND RELATIVE HUMIDITY FOR USE IN A VEHICLE HVAC SYSTEM

(75) Inventors: Thomas E. Blake, III, Novi, MI (US); Robert James Newton, Chesterfield, MI (US); Songwei Zhang, Troy, MI (US)

(73) Assignee: TRW Automotive U.S. LLC, Livoinia, MI (US)

( * ) Notice: Subject to any disclaimer, the term of this patent is extended or adjusted under 35 U.S.C. 154(b) by 1678 days.

(21) Appl. No.: 12/851,578

(22) Filed: Aug. 6, 2010

(65) Prior Publication Data
US 2012/0034857 A1 Feb. 9, 2012

(51) Int. Cl.
*B60H 1/00* (2006.01)
(52) U.S. Cl.
CPC .................................. *B60H 1/00785* (2013.01)
(58) Field of Classification Search
CPC .......................................................... B60H 1/00
USPC .......................................................... 454/75
See application file for complete search history.

(56) References Cited

U.S. PATENT DOCUMENTS

| | | | |
|---|---|---|---|
| 6,108,084 A * | 8/2000 | Winner | 356/338 |
| 6,422,062 B1 | 7/2002 | King et al. | |
| 7,102,501 B2 | 9/2006 | Lo Presti et al. | |
| 7,197,927 B2 | 4/2007 | Stauss et al. | |
| 7,222,666 B2 | 5/2007 | Homan et al. | |
| 7,392,838 B2 | 7/2008 | Errington et al. | |
| 2001/0032470 A1 | 10/2001 | Remond et al. | |
| 2001/0055663 A1* | 12/2001 | Mertzel et al. | 428/122 |
| 2003/0158718 A1* | 8/2003 | Nakagawa et al. | 703/13 |
| 2003/0169522 A1* | 9/2003 | Schofield et al. | 359/876 |
| 2004/0232773 A1* | 11/2004 | Parker et al. | 307/10.1 |
| 2006/0289458 A1 | 12/2006 | Kim et al. | |
| 2008/0066477 A1 | 3/2008 | Aoki et al. | |

FOREIGN PATENT DOCUMENTS

| | | |
|---|---|---|
| EP | 1 112 871 A1 | 7/2001 |
| EP | 1 112 871 B1 | 9/2003 |
| WO | WO-2006/029901 A1 | 3/2006 |
| WO | WO-2006/063827 A1 | 6/2006 |

* cited by examiner

*Primary Examiner* — Steven B McAllister
*Assistant Examiner* — Samantha Miller
(74) *Attorney, Agent, or Firm* — Tarolli, Sundheim, Covell & Tummino LLP

(57) ABSTRACT

A sensor module includes a housing. A heat source is located within the housing of the sensor module and a plurality of temperature sensors are mounted in housing of said sensor module. At least one temperature sensors is located adjacent to the heat source and at least one other temperature sensor is spaced from the heat source. A humidity sensor is located within the housing of the sensor module. A controller is connected to the plurality of temperature sensors and to the humidity sensor for determining at least one of relative humidity and temperature at the windscreen using a regression analysis and for providing a control signal indicative thereof.

10 Claims, 7 Drawing Sheets

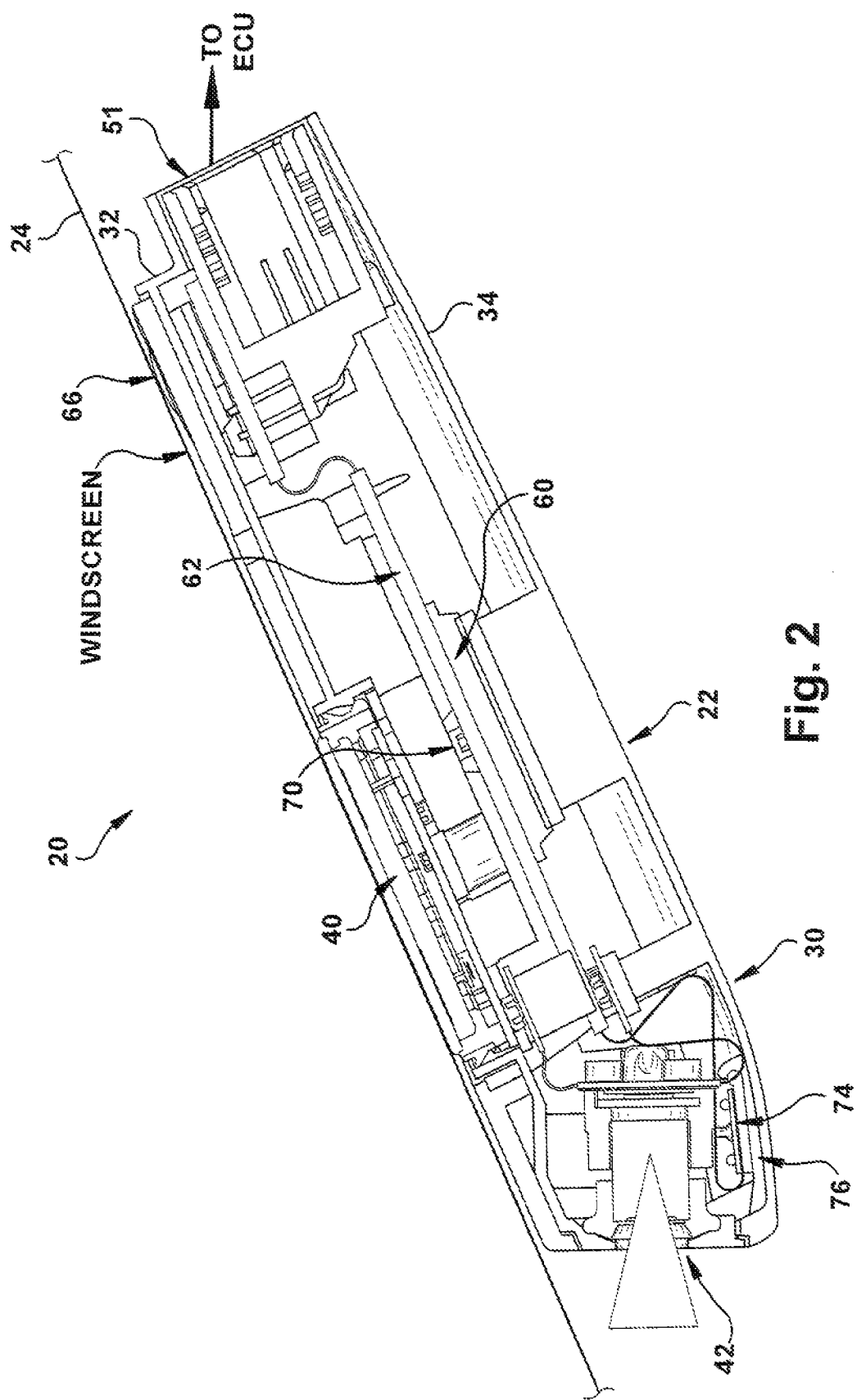

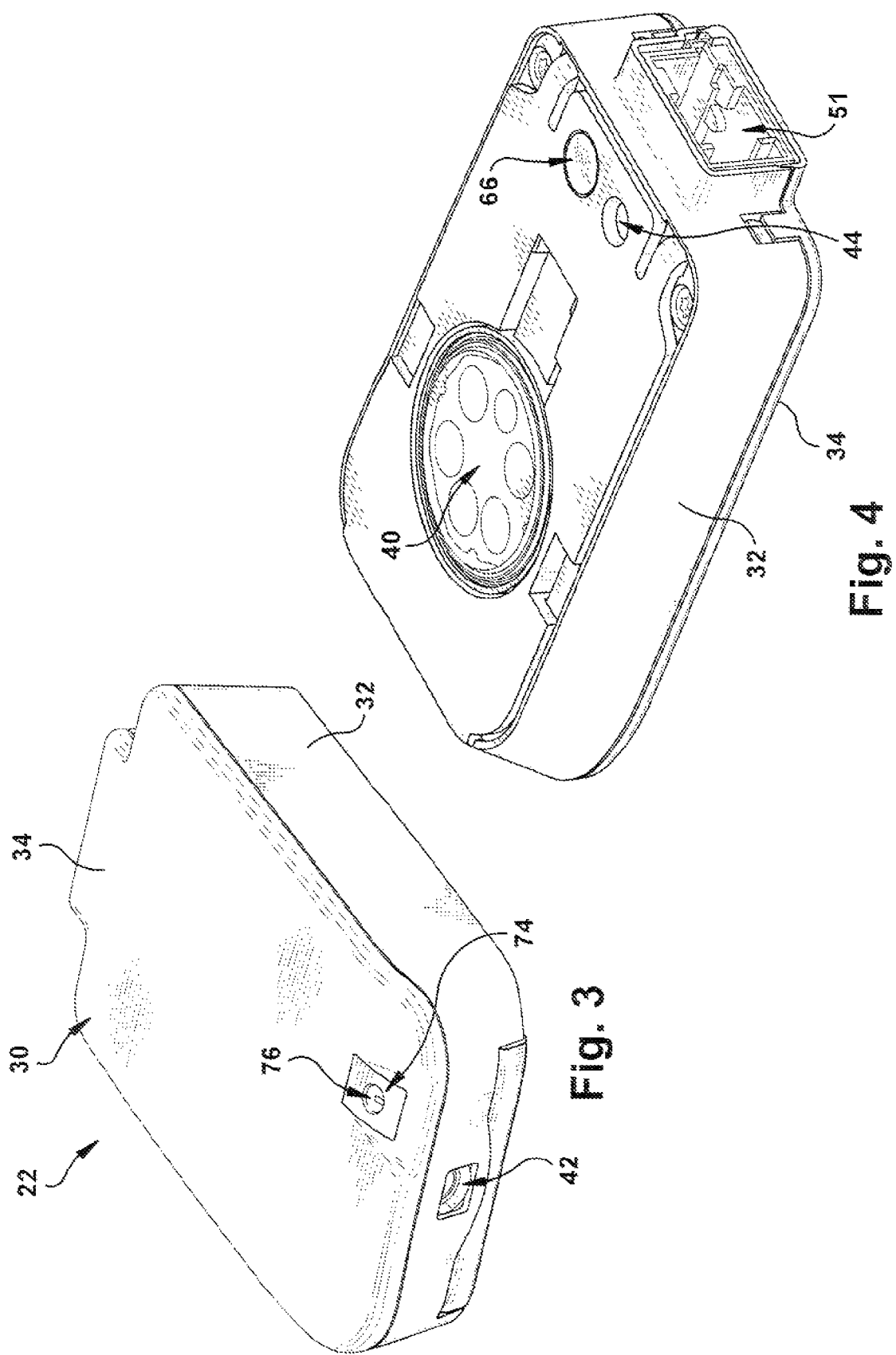

METHOD AND APPARATUS FOR DETERMINING TEMPERATURE AND RELATIVE HUMIDITY FOR USE IN A VEHICLE HVAC SYSTEM

TECHNICAL FIELD

The present invention is directed to a vehicle heating ventilation air conditioning ("HVAC") system and is particularly directed to a method and apparatus for determining temperature and relative humidity for use in a vehicle HVAC system.

BACKGROUND

A vehicle HVAC system is used to control the comfort level, e.g., temperature and humidity, within the vehicle cabin for the vehicle occupants. HVAC systems may allow the operator to manually set various operating parameters such as the ON/OFF state of the air conditioner, a desired temperature setting, a blower speed, airflow direction, the amount of air flow at the feet, the window, etc. Other vehicle HVAC systems use minimal operator input information, e.g., an operator desired temperature setting, and the remainder of the system parameters are automatically controlled.

One of the functions of a vehicle HVAC system is to prevent fogging of the vehicle windscreen (windshield) during vehicle operation. The prevention of windscreen fogging requires an accurate determination of the relative humidity in the vehicle adjacent to the windscreen and the temperature of the windscreen itself. It is known to combine (integrate) several vehicle sensing systems into one module. For example, a vehicle rain sensor for windscreen wiper control may be mounted in a module that is mounted against the inside of the windscreen in front of the rearview mirror. It is also known to mount a humidity sensor and an ambient air temperature sensor in the rain sensor module. Also, it is known to mount other types of sensors in the rain sensor module such as a forward looking camera. Certain sensors, such as the camera sensor, may have an associated processor circuit that generates a significant amount of heat. Heat generated from any heat source, e.g., a camera processor or any other type of heat source, can affect sensed condition of other sensors within the module such as temperature and humidity sensors. This heating effect can result in an improper determination of relative humidity thereby resulting in improper control of the vehicle's HVAC system and fogging of the windscreen.

SUMMARY OF THE INVENTION

The present invention is directed to a method and apparatus for determining relative humidity for a vehicle HVAC system by measuring temperature at a plurality of locations within the sensor module including at any heat source within the module and determining relative humidity using a temperature triangulation scheme. The vehicle's HVAC system is then controlled in response to the determined temperature and relative humidity in accordance with the present invention.

In accordance with one example embodiment of the present invention, a sensor module is provided having a housing. A heat source is located within the housing of the sensor module and a plurality of temperature sensors are mounted in housing of said sensor module. At least one temperature sensors is located adjacent to the heat source and at least one other temperature sensor is spaced from the heat source. A humidity sensor is located within the housing of the sensor module. A controller is connected to the plurality of temperature sensors and to the humidity sensor for determining relative humidity and temperature at the windscreen using a regression analysis and for providing a control signal indicative thereof.

In accordance with another aspect of the present invention, an apparatus is provided for aiding in prevention of vehicle windscreen fogging comprising a sensor module having a housing mountable to the inside of the windscreen and a heat source located within said housing of the sensor module. At least three temperature sensors are mounted in said housing of said sensor module, at least one of said temperature sensors being located adjacent to the heat source, at least another one of said temperature sensors being in thermal contact with the windscreen, and at least yet another one of said temperature sensor being spaced from said heat source and said windscreen. A humidity sensor is located within said housing of the sensor module and a controller is connected to said plurality of temperature sensors and to said humidity sensor for determining the relative humidity and temperature at the windscreen using a regression analysis and providing a control signal. A heating, ventilation, air conditioning system is operative with the windscreen of the vehicle and responsive to said control signal for controlling air flow and temperature and humidity of in-flowing air so as to aid in preventing windscreen fogging.

In accordance with another example embodiment of the present invention, a method is provided for aiding in prevention of vehicle windscreen fogging comprising the steps of mounting a sensor module having a housing to the inside of the windscreen, locating a heat source within said housing of the sensor module, locating at least three temperature sensors in said housing of said sensor module, at least one of said temperature sensors being located adjacent to the heat source, at least another one of said temperature sensors being in thermal contact with the windscreen, and at least yet another one of said temperature sensor being spaced from said heat source and said windscreen, locating a humidity sensor within said housing of the sensor module, determining the relative humidity and temperature at the windscreen in response to signals from said temperature sensors and said humidity sensor using a regression analysis and providing a control signal in response thereto, and controlling a heating, ventilation, air conditioning system operative with the windscreen of the vehicle in response to said control signal for controlling air flow and temperature and humidity of in-flowing air so as to aid in preventing windscreen fogging.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 2 is a larger schematic view of the sensor module of FIG. 1;

FIG. 3 is a bottom perspective view of the sensor module of FIG. 1;

FIG. 4 is a top perspective view of the sensor module of FIG. 1;

DETAILED DESCRIPTION

Figure 1:
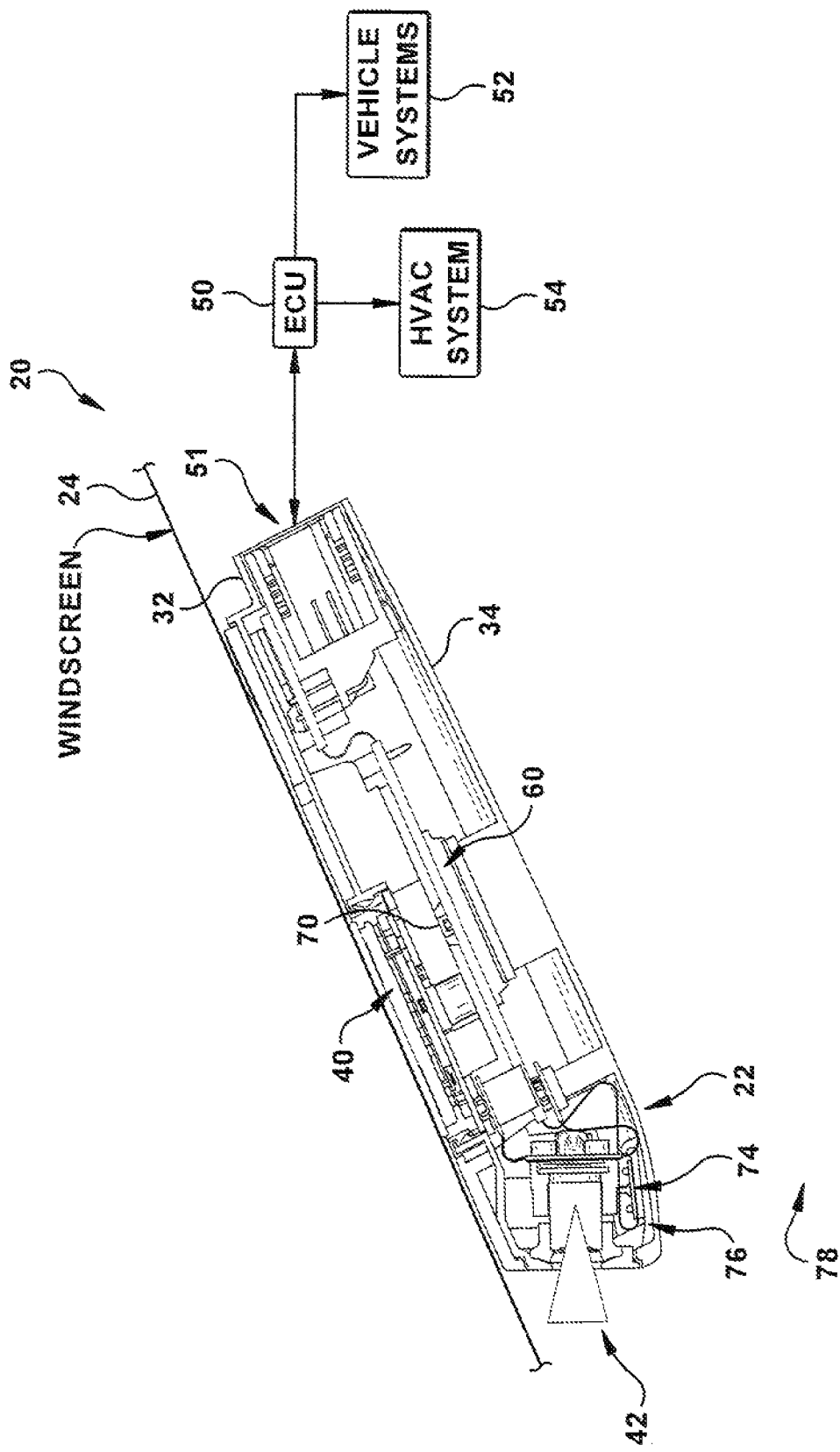
FIG. 1 is a schematic block diagram of a sensing arrangement made in accordance with one example embodiment of the present invention for determining temperature and relative humidity in a vehicle HVAC system.
Figure 5:
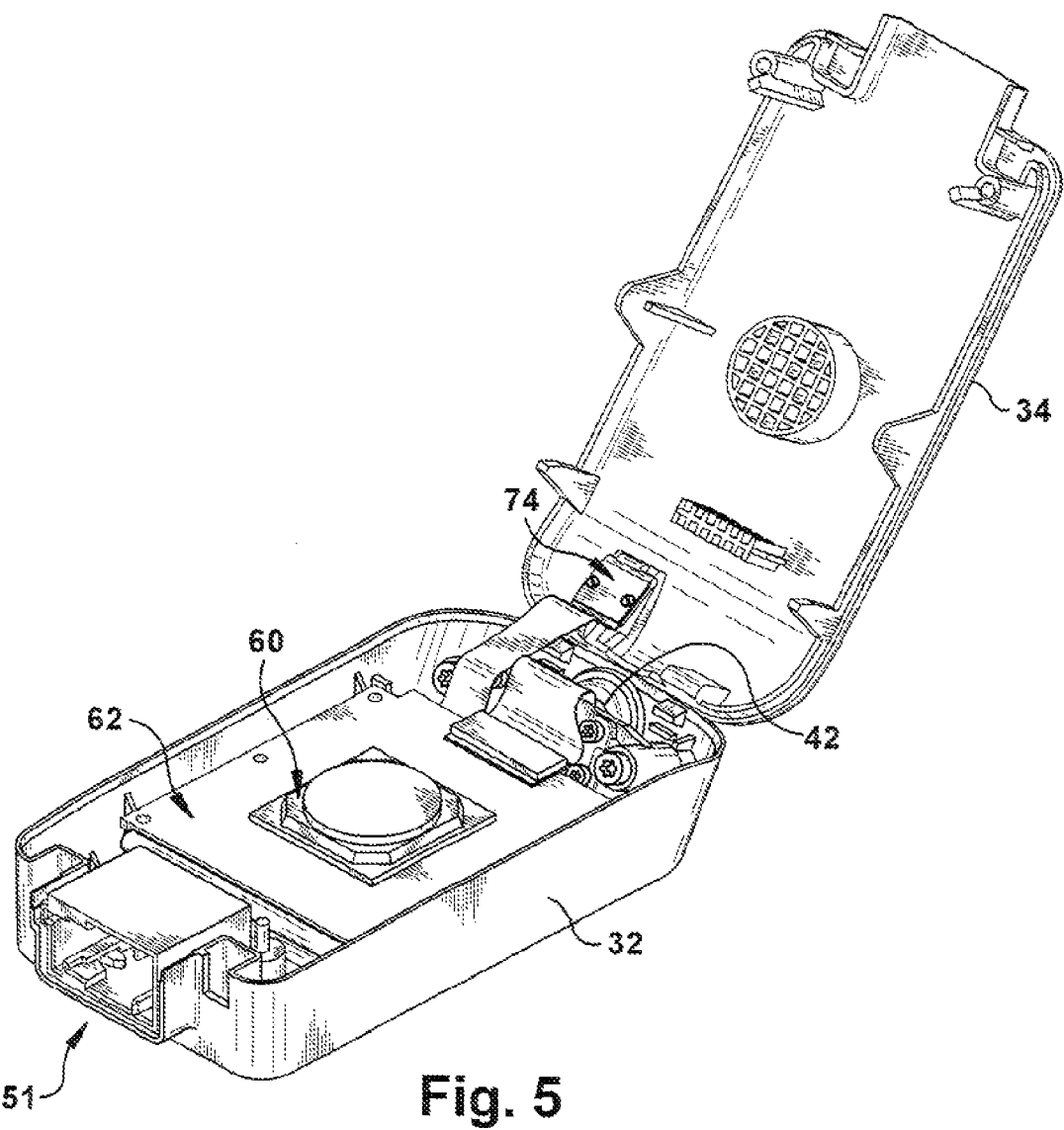
FIG. 5 is a perspective view of the sensor module of FIG. 1 with the cover in an open position.

Referring to FIGS. 1-6, a vehicle 20 has a sensor module 22 mounted to the inside of the vehicle's windscreen 24 using, for example, a translucent bonding material. The sensor module 22 includes a two part housing 30 having a base portion 32 and a cover 34. The housing 30 may be made from any of a variety of materials such as metal and specifically magnesium. The housing 30 encloses a plurality of operational sensors such as a rain sensor 40, a forward looking camera 42, and an ambient light sensor 44 (FIG. 4). Each of the operational sensors 40, 42, 44 provides sensor signals that are used to control associated vehicle functions. For example, the rain sensor 40 can be used to control vehicle wipers. The ambient light sensor 44 can be used to control the vehicle headlights. The forward looking camera 42 can be used as part of a lane departure warning system, a pedestrian detection system, or as part of a vehicle collision detection system. Structural details of the sensor module 22 are described in co-pending patent application to Blake et al., Ser. No. 12/836,125, filed Jul. 14, 2010 and entitled APPARATUS FOR USE IN ASSOCIATION WITH A VEHICLE, and is hereby incorporated herein by reference.

The sensors within the sensor module 22 may include associated signal processing circuitry. The outputs from the sensor signals, whether direct signals or processed signals, are connected to an electronic control unit ("ECU") 50 via a connector assembly 51. The ECU 50 monitors the sensor signals and controls associated vehicle systems 52, such as vehicle wipers, vehicle lights, lane departure warning system, actuatable restraints, pedestrian collision device, etc. In accordance with the present invention, a plurality of temperature sensors and a humidity sensor are located within the sensor module 22. The ECU 50, in accordance with the present invention, monitors the temperature sensors and humidity sensor and determines temperature, dew point, and relative humidity and controls the vehicle's HVAC system 54 to prevent fogging of the windscreen 24.

Certain operational elements within the sensor module 22, such as processing circuitry associated with the sensor(s), may generate a significant amount of heat within the sensor module 22. For example, the forward looking camera 42 has an associated signal processing circuit 60 mounted on a printed circuit board ("PCB") 62 that processes the camera signal and outputs associated signals to the ECU 50 for subsequent use, such as pedestrian detection, lane change warning system, etc. The processing circuit 60 may generate a significant amount of heat and, thereby, acts as a heat source that can heat the interior of the sensor module 22. Any such device that generates heat within the sensor module 22 is referred to in this application as a heat source. The presence of such a heat source within the sensor module 22 can inhibit the ability of the humidity sensor and temperature sensors from providing true readings that would allow an accurate determination of the temperature, relative humidity, and dew point necessary for prevention of windscreen fogging.

Figure 6:
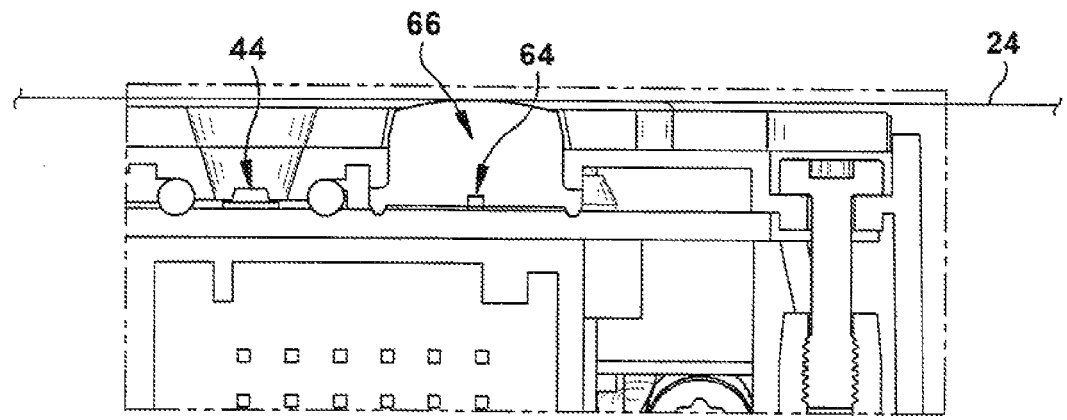
FIG. 6 is an enlarged side cross sectional view of a portion of the sensor module of FIG. 1 showing a windscreen temperature sensor.

The sensor module 22, in accordance with the present invention, includes three temperature sensors and a humidity sensor located at appropriate locations within the sensor module 22 to enable determination of the true temperatures and relative humidity needed to predict/detect a fogging condition of the windscreen 24. Specifically, a windscreen temperature sensor 64 is in thermal contact with the windscreen 24. As can be seen in FIG. 6, the windscreen temperature sensor 64 is embedded in a thermally conductive compound material 66 that is in contract with the windscreen 24 and transfers the windscreen temperature to the sensor 64. The windscreen temperature sensor 64 provides a signal indicative of the windscreen temperature to the ECU 50. The sensor module 22 further includes a second temperature sensor 70 mounted adjacent to the processing circuit (heat source) 60 on the PCB 62 opposite the processing circuit. This second temperature sensor 70 is referred to as the heat source temperature sensor and it provides a signal indicative of the heat source temperature to the ECU 50. The sensor module 22 further includes a humidity/temperature sensor 74 mounted in an opening 76 of the sensor module 22 so as to be exposed to ambient air. The humidity/temperature sensor 74 senses the humidity level of the air within the vehicle cabin 78 and provides a humidity signal indicative thereof to the ECU 50. Also, the humidity/temperature sensor 74 senses the cabin temperature and provides a temperature signal indicative thereof to the ECU 50. If the heat source 60 is operating, i.e., energized, and affecting the temperature within the sensor module 22, the temperature signal from the humidity/temperature sensor 74 will have an error value attributable to the heat source 60.

Figure 7:
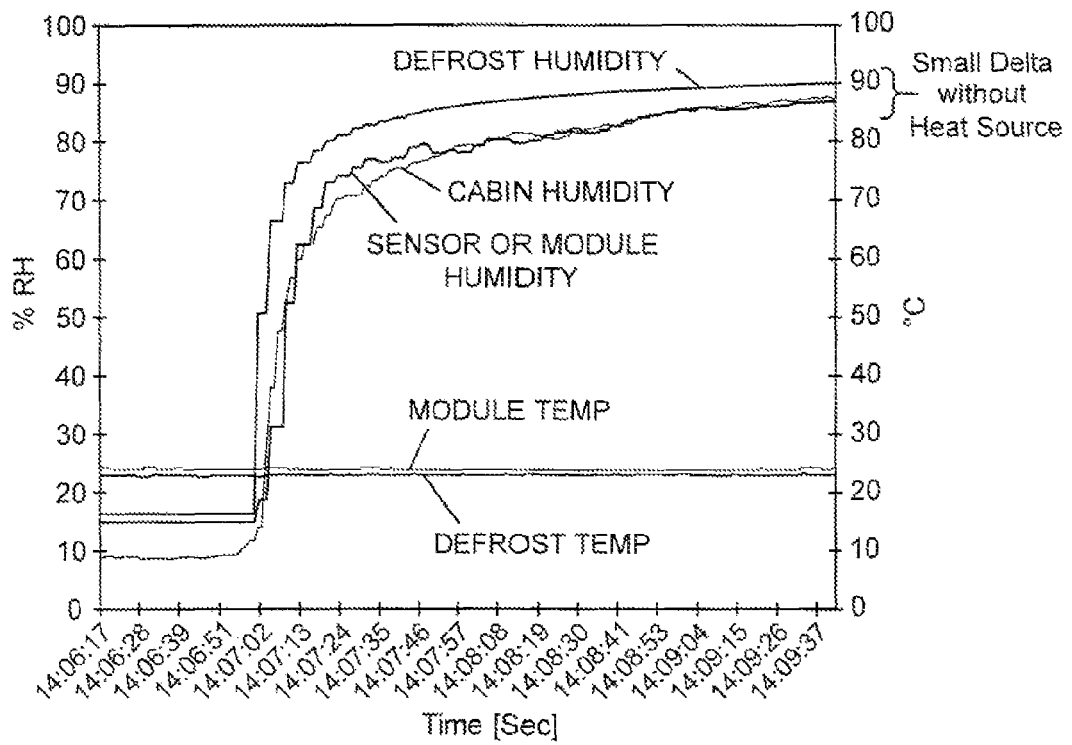
FIG. 7 is a graphical representation of the output signals from three temperature sensors when no heat source is active within the sensor module of FIG. 1.
Figure 8:
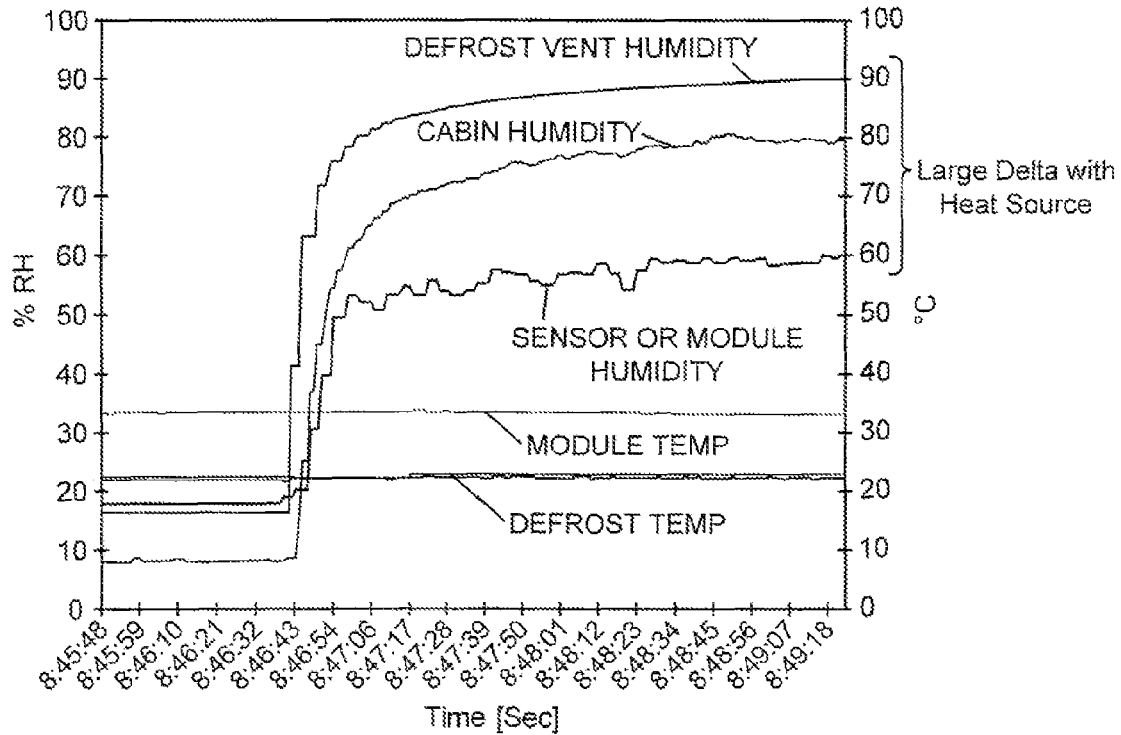
FIG. 8 is a graphical representation of the output signals from the three temperature sensors when a heat source is active within the sensor module of FIG. 1 without the temperature and humidity determinations of the present invention.

Referring to FIGS. 7 and 8, the temperature and relative humidity measurement and determination problem resulting from the presence of the heat source 60 in the sensor module 22 will be appreciated. The graphs of FIGS. 7 and 8 show a test set up that monitors the temperature within the sensor module and at the output of the defroster vent of the vehicle for illustration purposes and a graphical representation of the measured relative humidity of the module, at the defroster vent and within the vehicle cabin for illustration purposes. The graph of FIG. 7 shows the sensed temperature of the sensor module when the heat source 60 is not active. Note that the module temperature is the same as the sensed temperature at the defroster vent in this test set up. The relative humidity value based on the sensed temperature at the defrost vent, the module 22, and within the vehicle cabin shows a small delta when the heat source is not on. Referring to FIG. 8, the module temperature is shown when the heat source 60 is active. Note that the module temperature is greater than the temperature at the defroster vent due to the heating of the module from the heat source. The relative humidity values with the heat source on shows a large delta in the measured temperature readings and the determined relative humidity. The self-heating effect of the integrated module results in an increase in temperature at the point of measurement and a reduction in the amount of relative humidity.

In accordance with the present invention, a triangulation technique along with regression analysis is used on the sensor signals from the three temperature sensor signals and the humidity sensor signal so as to accurately predict/detect a fogging condition of the windscreen. A linear equation can be utilized to calculate actual temperature at the windscreen by triangulating three available temperatures. The coefficients of this linear equation can be obtained via a regression analysis over the sensor module 22 operating range.

Figure 9:
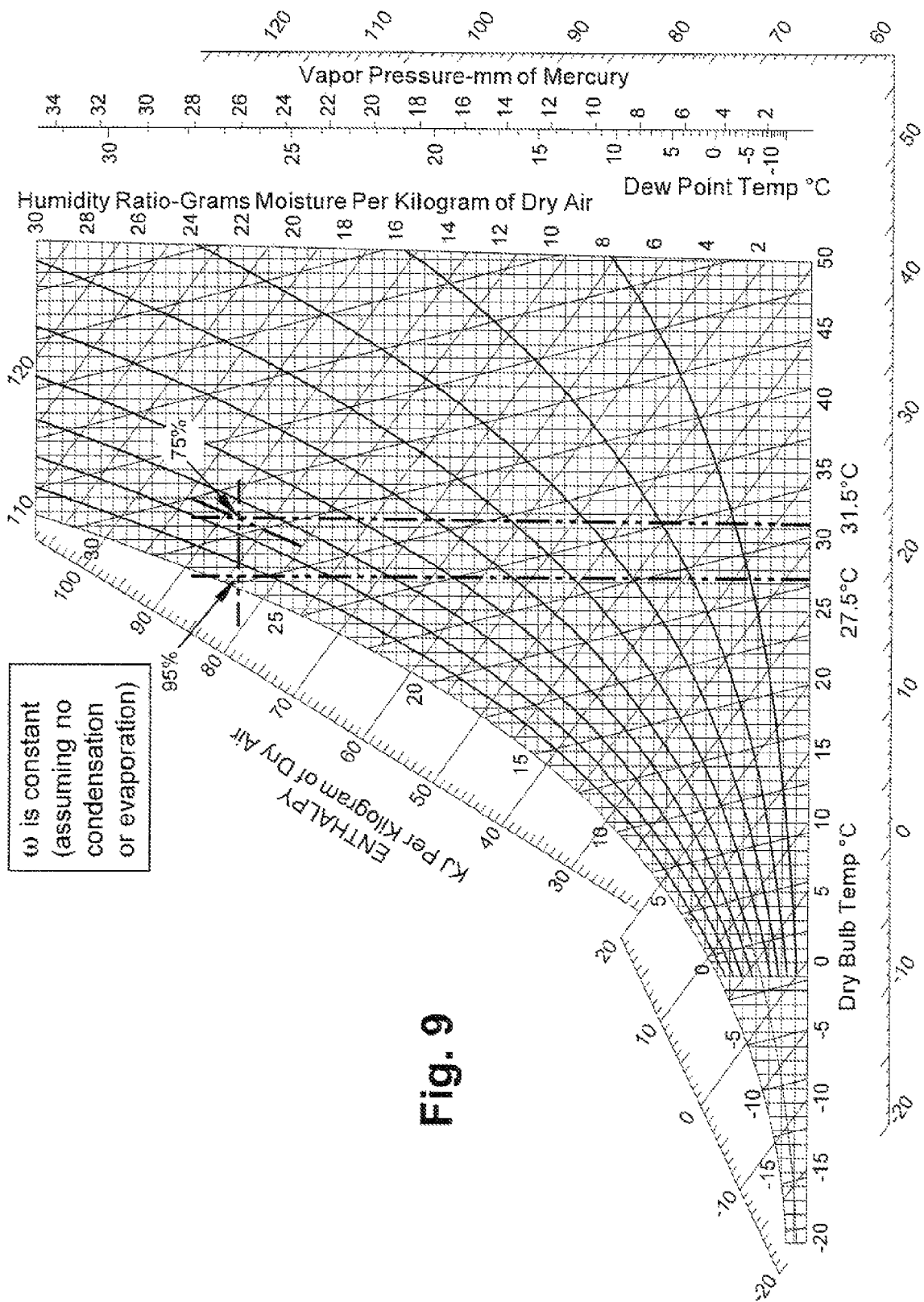
FIG. 9 is a graphical representation of a psychrometric chart used to determine certain values for use with the present invention.

A linear triangulation, in accordance with one example embodiment of the present invention, to determine windscreen temperature is:

Windscreen temp=(7.95−0.0926 heat source temp−0.0736 measured windscreen temp+0.889 humidity sensor temp)

assuming all temperatures are measured in degrees C. For a measured humidity sensor 74 temperature $T_s$ and a triangulated windscreen temperature $T_w$, the relative humidity at windscreen $\phi_w$ can be calculated from the measured relative humidity at sensor 74 $\phi_s$ through the following relation:

$$\frac{\phi_w}{\phi_s} = \frac{P_g(T_s)}{P_g(T_w)}$$

where $P_g(T_s)$ and $P_g(T_w)$ are the water vapor saturation pressure at $T_s$ and $T_w$ respectively. Using the psychrometric chart of FIG. 9 or using any of the following equations:

ArdenBuck Equation

−40° C. to 50° C.

$$P = 6.1121 \exp\left(\frac{(18.678 - T/234.5)T}{257.14 + T}\right)$$

P = Pressure [hPa]

T = Temperature [° C.]

IrvineLiley Equation

0° C. to 327° C.

$$T = 42.6776 + \left(\frac{-3892.7}{-9.48654 + LnP}\right)$$

P = Pressure [MPa]

T = Temperature [° K]

Antoine Equation$_1$

1° C. to 100° C.

A = 8.07131

B = 1730.63

C = 233.426

$$P = = 10^{A - \frac{B}{C+T}}$$

P = Pressure [mmHg]

T = Temperature [° C.]

Antoine Equation$_2$

99° C. to 374° C.

A = 8.14019

B = 1810.94

C = 244.485

$$P = = 10^{A - \frac{B}{C+T}}$$

P = Pressure [mmHg]

T = Temperature [° C.]

the water vapor saturation can be calculated for a given temperature. In accordance with the present invention, the sensed temperatures are used to predict the windscreen temperature. The ECU 50 does the determinations and makes humidity corrections and adjustments based on water vapor pressure relationships to prevent windscreen fogging. These several equations are used to convert the manual psychrometric chart of FIG. 9 into a more useful format.

Figure 10:
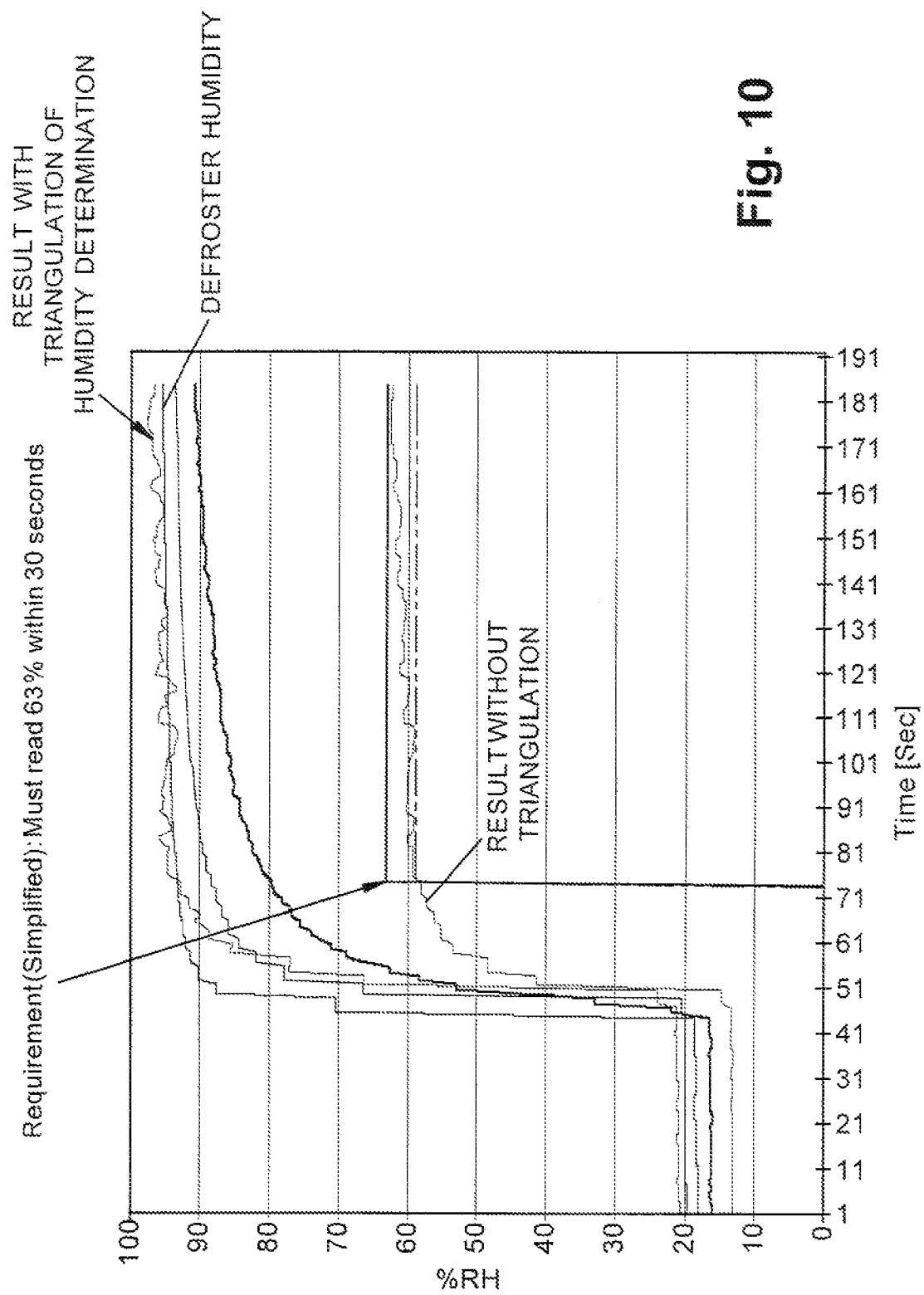
FIG. 10 is a graphical representation of humidity output signals from three temperature and humidity sensors when a heat source is active within the sensor module of FIG. 1 with the temperature and humidity determinations in accordance with the present invention.

Referring to FIG. 10, a graph is depicted to show a comparison in a test set up of the relative humidity determination with and without the triangulation technique of the present invention. A goal of the present invention is to be able to accurately determine the relative humidity within 63% of the actual value within 30 seconds of data analysis. FIG. 10 shows that the present invention achieves this result. It should be appreciated that the present invention permits a determination of the actual temperature and humidity in the air space adjacent to the windscreen by taking measurements in an artificially heated location using discrete sensors integrated into a signal, high density module.

From the above description of the invention, those skilled in the art will perceive improvements, changes and modifications. Such improvements, changes and modifications within the skill of the art are intended to be covered by the appended claims.

Having described the invention, the following is claimed:

1. A sensor module comprising:
a housing;
a heat source device located within the housing of the sensor module;
a plurality of temperature sensors mounted in housing of said sensor module, at least one temperature sensor located adjacent to said heat source device and at least one other temperature sensor spaced from said heat source device;
a humidity sensor located within said housing of said module; and
a controller connected to said plurality of temperature sensors and to said humidity sensor for determining relative humidity and temperature at the windscreen using a regression analysis and for providing a control signal indicative thereof.

2. The sensor module of claim 1 wherein said plurality of temperature sensors includes at least three temperature sensors and said regression analysis includes temperature triangulation.

3. The sensor module of claim 2 wherein said sensor module is mounted against a glass surface and wherein at least one of said temperature sensors measures the temperature of said glass.

4. The sensor module of claim 3 wherein said controller is connected to a heating ventilation and air conditioning unit and controls said unit in response to determined relative humidity and temperature so as to aid in preventing fogging of said glass surface.

5. The sensor module of claim 1, further comprising a rain sensor to provide a control signal to a vehicle component.

6. The sensor module of claim 1, wherein said heat source device is a processing circuit.

7. The sensor module of claim 1, wherein activation of said heat source device generates heat within the sensor module.

8. The sensor module of claim 1, wherein said temperature sensor is mounted to said heat source device.

9. An apparatus for aiding in prevention of vehicle windscreen fogging comprising:
- a sensor module having a housing mountable to the inside of the windscreen;
- a heat source device located within said housing of the sensor module;
- at least three temperature sensors mounted in said housing of said sensor module, at least one of said temperature sensors located adjacent to said heat source device, at least another one of said temperature sensors being in thermal contact with the windscreen, and at least yet another one of said temperature sensor spaced from said heat source and said windscreen;
- a humidity sensor located within said housing of the sensor module;
- a controller connected to said plurality of temperature sensors and to said humidity sensor for determining the relative humidity and temperature at the windscreen using a regression analysis and providing a control signal; and
- a heating, ventilation, air conditioning system operative with the windscreen of the vehicle and responsive to said control signal for controlling air flow and temperature and humidity of in-flowing air so as to aid in preventing windscreen fogging.

10. A method for aiding in prevention of vehicle windscreen fogging comprising the steps of:
- mounting a sensor module having a housing to the inside of the windscreen;
- locating a heat source device within said housing of the sensor module;
- locating at least three temperature sensors in said housing of said sensor module, at least one of said temperature sensors being located adjacent to said heat source device, at least another one of said temperature sensors being in thermal contact with the windscreen, and at least yet another one of said temperature sensor being spaced from said heat source device and said windscreen;
- locating a humidity sensor within said housing of the sensor module;
- determining the relative humidity and temperature at the windscreen in response to signals from said temperature sensors and said humidity sensor using a regression analysis and providing a control signal in response thereto; and
- controlling a heating, ventilation, air conditioning system operative with the windscreen of the vehicle in response to said control signal for controlling air flow and temperature and humidity of in-flowing air so as to aid in preventing windscreen fogging.

* * * * *